July 8, 1947. I. WOLFF 2,423,671
APPARATUS FOR AND METHOD OF PULSE LIMITATION AND AMPLIFICATION
Filed Jan. 29, 1940 2 Sheets-Sheet 1

Inventor
Irving Wolff
By
Attorney

Patented July 8, 1947

2,423,671

UNITED STATES PATENT OFFICE 2,423,671

APPARATUS FOR AND METHOD OF PULSE LIMITATION AND AMPLIFICATION

Irving Wolff, Merchantville, N. J., assignor to Radio Corporation of America, a corporation of Delaware Application January 29, 1940, Serial No. 316,223

7 Claims. (Cl. 178—44)

This invention relates to improvements in the apparatus for and the method of pulse limitation and amplification.

In a pulse-echo system for the detection of obstacles or the measurement of distance a sharply defined pulse is propagated toward a wave reflecting object. The propagated pulse, after reflection, is received. The received pulse indicates the existence of the wave reflecting object. Furthermore, if the time interval between the outgoing pulse and the incoming pulse is measured, the distance the pulse has travelled and hence the distance to the object may be calculated or indicated.

In pulse systems of the foregoing type, the receiver and transmitter are generally located at a common station. Since the outgoing pulse is of large amplitude, it tends to overload the receiver, which may block unless precautions are taken. One precaution is to shield the receiver; the shielding will not prevent direct reception through the receiver input. Another treatment is to vary cyclically the receiver sensitivity so that the response is minimized for the outgoing pulse and increased for the reflected pulses or signals.

The present invention has for one of its objects the provision of means for limiting the amplitude of response of a pulse receiver. Another object is the provision of means for limiting and amplifying unidirectional pulse signals. Another object is to provide an improved method of pulse limitation and pulse amplification. An additional object is to provide improved and more efficient means for limiting and amplifying pulses than have heretofore been available.

Figure 1:
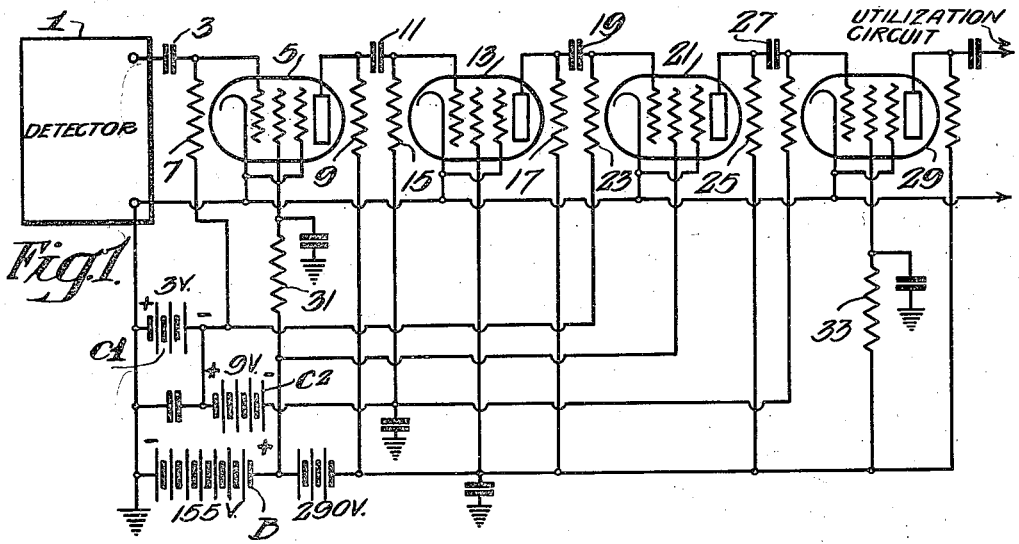
Figure 2:
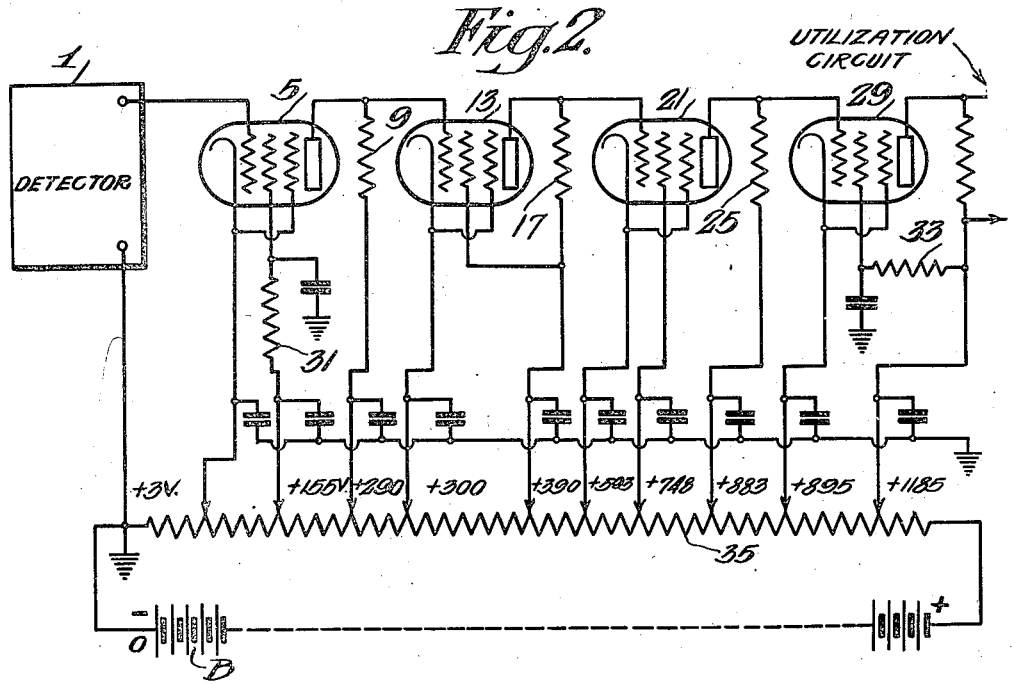
Figure 3:
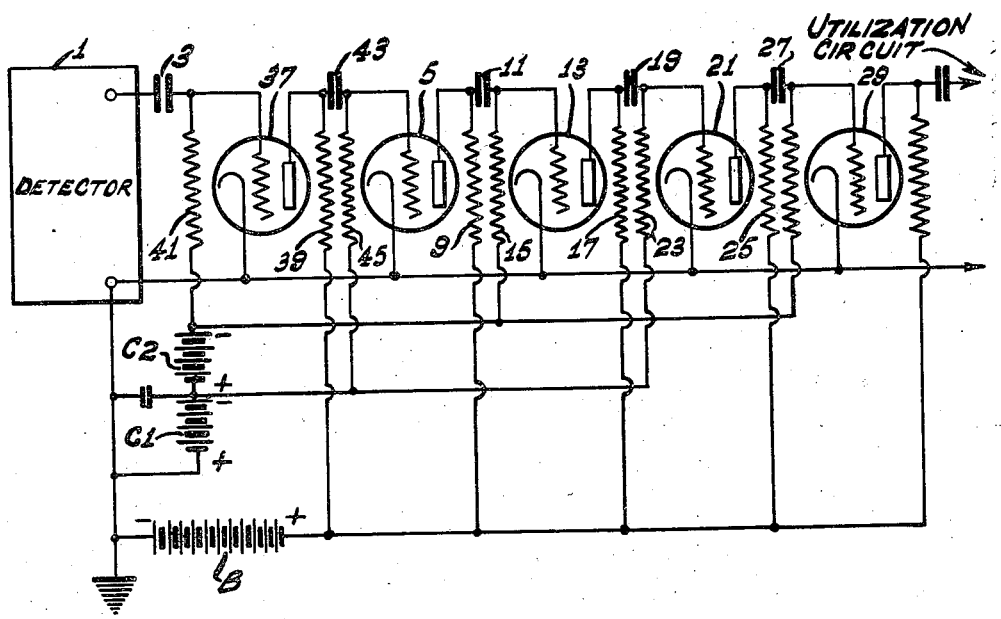

The invention will be described by referring to the accompanying drawing in which Fig. 1 is a circuit diagram of one embodiment of the invention; Fig. 2 is a circuit diagram of a modification of the invention, and Fig. 3 is a circuit diagram of a further modification of the invention. Similar reference numerals indicate similar elements in the several drawings.

Referring to Fig. 1, the output of a detector 1 or other source of pulse signals is connected through a blocking capacitor 3 to a thermionic amplifier 5. The input or grid circuit of the amplifier 5 is biased negatively by a resistor 7 which is connected to a biasing battery C1. The output or anode circuit of the amplifier includes a resistor 9 which is connected to the positive terminal of an anode battery B. The output of the amplifier 5 is connected through a blocking capacitor 11 to the grid circuit of a second amplifier 13. The grid circuit of the second amplifier 13 is biased negatively by a connection through a resistor 15 to a biasing battery C2 whose voltage may be supplemented by that of the first battery C1. The anode circuit of the second amplifier 13 includes a resistor 17 which is connected to the anode battery B. The output of the second amplifier 13 is connected through a blocking capacitor 19 to the input of a third amplifier 21.

The input circuit of the third amplifier 21 includes a resistor 23 which is connected to the first named battery C1 to bias the amplifier 21. The output circuit of the third amplifier includes a resistor 25 which is connected to the anode battery B. The third amplifier output is applied through a blocking capacitor 27 to a fourth amplifier 29. The fourth amplifier 29 has its input and output circuits arranged in a manner similar to those of the second amplifier 13. The output of the fourth or last amplifier 29 is connected to a utilization circuit which may include any suitable type of signal responsive device. The screen grids are connected to the anode battery B. Filters 31, 33 may be included in one or more of the screen grid leads. The several batteries may be bypassed.

By way of example, the first and third amplifiers 5, 21 may be of the type known as RCA 1851. These amplifiers have input circuits which are biased three volts negatively on the grid. The anode battery has a potential of 290 volts. The second and fourth amplifiers may be of the type known as RCA 6V6G. The grid electrodes of the second and fourth amplifiers are biased twelve volts negatively. While the foregoing arrangement has the outward appearance of a resistance coupled amplifier, the choice of amplifier tubes and the biases therefor indicate a difference which appears in the mode of operation.

The operation of the amplifier is based upon the application of a unidirectional current pulse. If the detector 1 is arranged so that pulse signals are applied only in a negative sense to the input of the first amplifier, it follows that the maximum effect is to block the anode current. By adjusting the initial bias C1 the first amplifier may be made to limit its output to any desired value. Furthermore, in view of the mode of operation a tube of relatively low output power may be used.

The output signals from the first amplifier will be limited pulses in the positive sense only. Therefore, the input bias of the second amplifier 13 is preferably adjusted so that the maximum limited positive pulse from the first amplifier 5 will not draw grid current in the second amplifier. The output signals from the second amplifier are pulses in the negative sense only. These pulses are applied to the third amplifier 21, which, like the first amplifier, is a tube of low power output. Furthermore, the third tube is biased negatively so that its output can not exceed its anode current swinging to zero. The output pulses from the third tube are limited and are in the positive sense only. Hence, the input bias of the fourth and last tube 29 is adjusted so that the applied positive pulses do not exceed the bias and so that no grid current is drawn.

Thus, the first and third amplifier tubes are adjusted so that they amplify, limit, and convert the negative pulses applied thereto into positive pulses of limited amplitude. The second and fourth amplifier tubes are adjusted to amplify the positive pulses which are derived from the first and third tubes, respectively. The amplifier will be responsive to alternating currents and therefore any incoming negative pulses will cause slight shifts in the grid bias toward a more positive condition during the intervals when no pulses are applied and vice versa. This condition may be taken into account in determining the initial biases.

There are uses in which the alternating current amplifier circuit of Fig. 1 will not be desirable because of the time constants of the capacitor-resistor networks. For uses in which the amplifier must be responsive to direct currents the form of circuit illustrated in Fig. 2 should be used. The difference between the connections of Fig. 1 and Fig. 2 is that in the latter the blocking capacitors and grid leaks are omitted. The several grid biasing voltages and anode voltages are derived from a potentiometer 35. The several connections to the potentiometer are bypassed to ground. In Fig. 1 the grid bias applied to the first and third tubes is 3 volts and to the second and fourth, 12 volts. In Fig. 2 the second tube is negatively biased to 10 volts, and the fourth to 12 volts to permit the last tube to amplify pulses of greater amplitude without overloading.

It should be understood that the biases, anode, and screen voltages have been selected, by way of example. Other potentials may be employed. Likewise the invention is not limited to the exemplified tubes; triodes or the like may be used. The network may be arranged to amplify positive pulses and to limit the succeeding negative pulses, as shown in Fig. 3, wherein an amplifier tube 37 is provided ahead of the first limiter 5 with a grid leak 41 connected to the bias source C2 and a load resistor 39 coupled to the grid of the limiter 5 through a capacitor 43. Furthermore the invention is not limited to the use of two pair of tubes, nor to the use as a pulse amplifier in a radio echo system, but may be employed generally in the amplification and limitation of unidirectional pulses.

I claim as my invention:

1. The method of amplifying and limiting unidirectional current pulses which includes amplifying a unidirectional current pulse to an amplitude not in excess of a predetermined value irrespective of the amplitude of the applied pulse, amplifying said amplified pulse without altering its wave form, further amplifying said second mentioned amplified pulse to an amplitude not in excess of a predetermined value irrespective of the amplitude of said second mentioned amplified pulse, and still further amplifying the third mentioned amplified pulse without altering its wave form.

2. The method of amplifying and limiting unidirectional current pulses which includes deriving a unidirectional current pulse, amplifying said pulse to an amplitude not in excess of a predetermined value irrespective of the amplitude of the applied pulse, amplifying said amplified pulse without modifying its shape, further amplifying said second mentioned amplified pulse to an amplitude not in excess of a predetermined value irrespective of the amplitude of said second mentioned amplified pulse, and still further amplifying the third mentioned amplified pulse without modifying its shape.

3. The method of amplifying and limiting unidirectional current pulses which includes converting a negative pulse into a positive pulse having an amplitude not in excess of a predetermined limit, converting said positive pulse into an amplified negative pulse without distorting said amplified negative pulse shape, converting said amplified negative pulse into a positive pulse of an amplitude not in excess of a predetermined limit, and amplifying said last mentioned positive pulse without distorting its shape.

4. The method of amplifying and limiting unidirectional current pulses which includes amplifying a pulse and obtaining from said amplified pulse a negative pulse without distorting said pulse shape, converting said negative pulse into a positive pulse having an amplitude not in excess of a predetermined limit, converting said positive pulse into an amplified negative pulse without distorting said positive pulse shape in said conversion, converting said amplified negative pulse into a positive pulse of an amplitude not in excess of a predetermined limit, and amplifying said last mentioned positive pulse without distorting the shape of said last mentioned positive pulse.

5. A pulse amplifier including in combination pairs of amplifiers connected in cascade, the first of said pairs including a first amplifier for amplifying and limiting pulses and a second amplifier of substantially greater power amplification capability than said first amplifier for amplifying the pulses from said first amplifier without altering the shape of the pulses from said first amplifier, and the second of said pairs including a third amplifier for amplifying and limiting pulses and a fourth amplifier of substantially greater power amplification capability than said third amplifier for amplifying the pulses from said third amplifier without altering the shape of the pulses from said third amplifier.

6. A pulse amplifier including in combination pairs of amplifiers connected in cascade, the first of said pairs including a first amplifier for amplifying and limiting negative pulses and a second amplifier of substantially greater power amplification capability than said first amplifier for amplifying the pulses from said first amplifier without altering the shape of the pulses from said first amplifier, and the second of said pairs including a third amplifier for amplifying and limiting negative pulses and a fourth amplifier of substantially greater power amplification capability than said third amplifier for amplifying the pulses from said third amplifier without altering the shape of the pulses from said third amplifier.

7. A pulse amplifier including in combination pairs of amplifiers connected in cascade, the first of said pairs including a first amplifier for converting negative pulses into positive pulses of limited amplitude and a second amplifier for amplifying and converting said positive pulses of limited amplitude into negative pulses, said second amplifier having a substantially greater power rating than said first amplifier and biased to amplify without distortion, and the second of said pairs including a third amplifier for converting the negative pulses from said second amplifier into positive pulses of limited amplitude and a fourth amplifier for amplifying the pulses from said third amplifier, said fourth amplifier having a substantially greater power rating than said third amplifier and biased to amplify without distortion.

IRVING WOLFF.

REFERENCES CITED

The following references are of record in the file of this patent:

UNITED STATES PATENTS

| Number    | Name     | Date          |
|-----------|----------|---------------|
| 1,916,404 | Barton   | July 4, 1933  |
| 1,481,284 | Dardorff | Jan. 22, 1924 |
| 2,112,705 | McCaa    | Mar. 29, 1938 |
| 2,086,566 | McCaa    | July 13, 1937 |
| 1,830,240 | Peterson | Nov. 3, 1931  |